United States Patent [19]

Parr

[11] 4,130,305
[45] Dec. 19, 1978

[54] PUSH-IN PIPE CONNECTOR

[76] Inventor: Edward L. Parr, 301 N. Cuyamaca, El Cajon, Calif. 92020

[21] Appl. No.: 814,225

[22] Filed: Jul. 11, 1977

[51] Int. Cl.² .......................................... F16L 37/00
[52] U.S. Cl. ..................................... 285/308; 285/371; 403/303; 403/314
[58] Field of Search .................... 285/5, 305, 308, 309, 285/310, 370, 371, 397, 398; 403/102, 293, 297, 314, 319, 303

[56] References Cited

U.S. PATENT DOCUMENTS

| 2,850,304 | 9/1958 | Wagner | 285/397 |
| 3,484,830 | 12/1969 | Wagner | 403/297 X |

FOREIGN PATENT DOCUMENTS

| 744284 | 2/1956 | United Kingdom | 285/397 |
| 1057158 | 2/1967 | United Kingdom | 285/397 |
| 1097534 | 1/1968 | United Kingdom | 403/297 |
| 1199686 | 7/1970 | United Kingdom | 285/397 |

Primary Examiner—Werner H. Schroeder
Assistant Examiner—C. J. Arbes
Attorney, Agent, or Firm—Brown & Martin

[57] ABSTRACT

A pipe connector for gripping pipes which are pushed into the ends of the connector. A hinged locking member is supported in each end of the connector by a releasable clamp, the locking member having a spring biased hinged bar element which extends diametrically and jams across the inside of the pipe when the pipe is pulled out very slightly. The locking members are attached to the clamp at the axis of the connector, so that the pipes can be rotated axially while held in place. When the clamp is released the locking members are loosened or fall free inside the connector and allow the pipes to be removed.

10 Claims, 4 Drawing Figures

U.S. Patent      Dec. 19, 1978      4,130,305

PUSH-IN PIPE CONNECTOR

BACKGROUND OF THE INVENTION

Pipe connectors of the quick assembly and disassembly type have used many different mechanisms with clamps, latches, retaining rings, tapered jamming elements and the like. If the pipes are subjected to tension during handling, or internal pressure in use, some type of positive lock is necessary. Clamp rings, screw gripping devices and the like are often cumbersome and require a certain amount of time to assemble. Latch types often require engagement and disengagement of pipe and connector at an angle to interfit the elements, which may not always be practical.

SUMMARY OF THE INVENTION

The pipe connector described herein receives a pipe with a simple straight in pushing action and locking is achieved by a very slight withdrawal of the pipe. The locking member is completely internal and has a clamp member which bears on the internal wall of the pipe, with a hinged locking bar which extends diametrically across the pipe and jams into the internal wall on the opposite side. The locking bar pivots to allow insertion of the pipe, but is gripped and jammed in place by a slight withdrawal of the pipe. A spring bias on the locking arm ensures engagement. Tension or internal pressure increases the jamming action for a secure joint.

In a double ended straight through connector, two locking members are held by a single central clamp having a bolt extending externally of the connector and secured by a clamp nut. The clamp is tightened before use of the connector and need not be adjusted during assembly. The locking members are attached to the clamp at the axis of the connector and are axially rotatable in the clamp, which permits rotation of a pipe in the connector while held in place. To disconnect the pipe joint the nut is loosened, releasing the clamp and allowing the locking members to become loose or fall free inside the connector, so that the pipes are easily withdrawn.

The primary object of this invention, therefore, is to provide a new and improved pipe connector.

Another object of this invention is to provide a pipe connector which receives and secures a pipe by a simple push-in action.

Another object of this invention is to provide a pipe connector in which a pipe is axially rotatable while secured.

Another object of this invention is to provide a pipe connector in which tension on or internal pressure in the connected assembly tightens the locking action.

A further object of this invention is to provide a pipe connector which is released by loosening a normally tight external clamp.

Other objects and advantages will be apparent in the following detailed description, taken in conjunction with the accompanying drawing, in which.

DESCRIPTION OF THE PREFERRED EMBODIMENT

Figure 1:
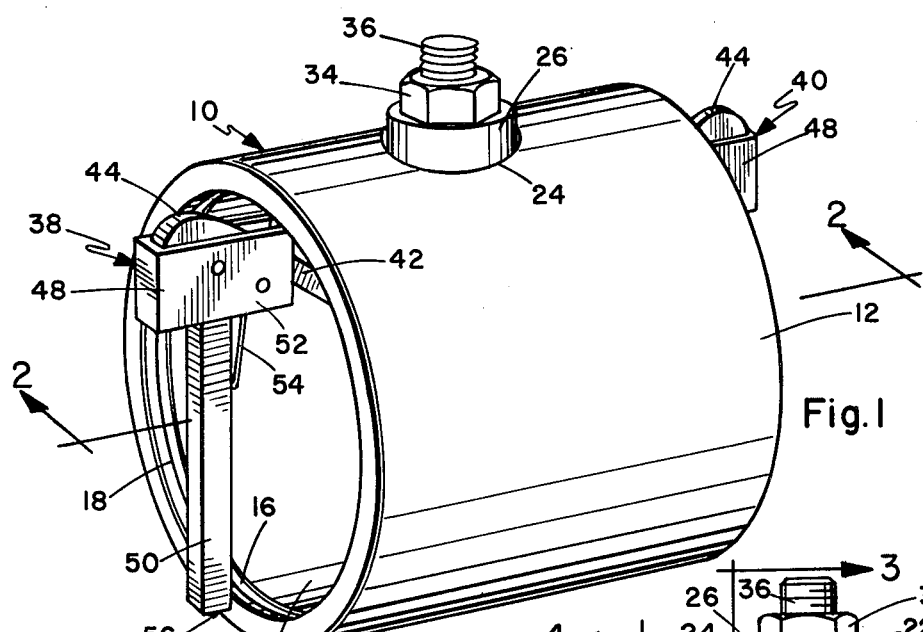
FIG. 1 is a perspective view of one form of the pipe connector.

The pipe connector 10 comprises a cylindrical body 12 having an internal bore 14, with an O-ring 16 inset in an annular groove 18 adjacent each end. The exterior of the body 12 may be of any suitable configuration, depending on the particular use.

In the central portion of body 12 is a radially extending bolt hole 20 to receive a clamp bolt 22, which projects externally of the body. The outer end of bolt hole 20 has an enlarged counterbore 24 to provide a seat for a sealing collar 26, which fits over clamp bolt 22 and contains an O-ring 28 to seal the bolt to the body. The inner end 30 of clamp bolt 22 has an enlarged cup portion 32 with an annular channel 33. A nut 34 is fitted on the threaded outer end 36 of the clamp bolt.

Mounted in opposite ends of body 12 are identical locking members 38 and 40, which are shown projecting slightly from the body but could be completely internal. Locking member 38 has a support bar 42 which extends diagonally outwardly from the axis of the body and has a conical head 43 at the inner end to seat in the channel 33. The outer end of support bar 42 has a radially outwardly offset bearing knob 44 and an inwardly turned stop portion 46, which may be formed integrally by bending the support bar from bar stock, such as the square cross section material shown. Fixed to the outer end of support bar 42 and stop portion 46, by welding or similar means, is a yoke-like support bracket 48. A locking bar 50 is pivotally mounted in bracket 48 on a hinge pin 52 and swings to extend diametrically across the internal bore 14. The locking bar is biased to the extended position by suitable spring means, such as the torsion spring 54. Stop portion 46 limits the outward motion of the locking bar 50, which is free to swing inwardly into body 12 against spring 54. Projecting from the free end of locking bar 50 is a small retaining spike 56.

A sleeve 58 is fitted over clamp bolt 22 between the inner wall of body 12 and the cup portion 32, the sleeve having an undercut annular channel 60 opposing channel 33. The conical heads 43 of the locking members are thus held in the opposed channels and clamped between the sleeve 58 and cup portion 32 when nut 34 is tightened. Notches 62 in cup portion 32 hold support bars 42 in opposed alignment.

Figure 2:
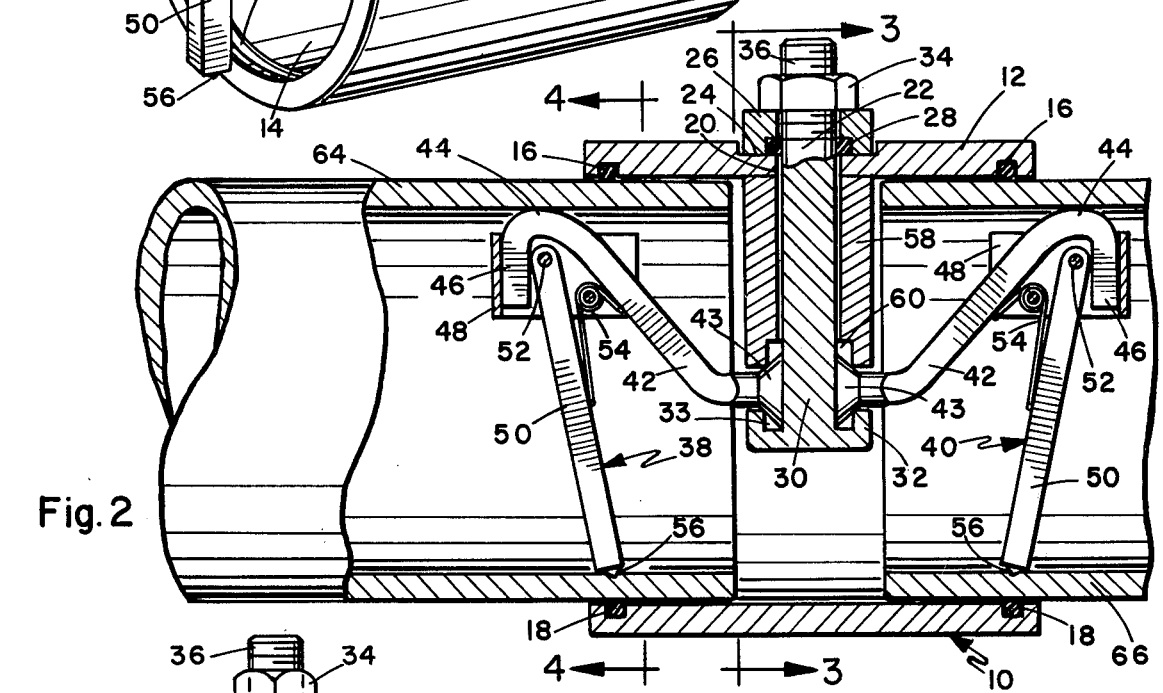
FIG. 2 is a sectional view taken on line 2—2 of FIG. 1.
Figure 3:
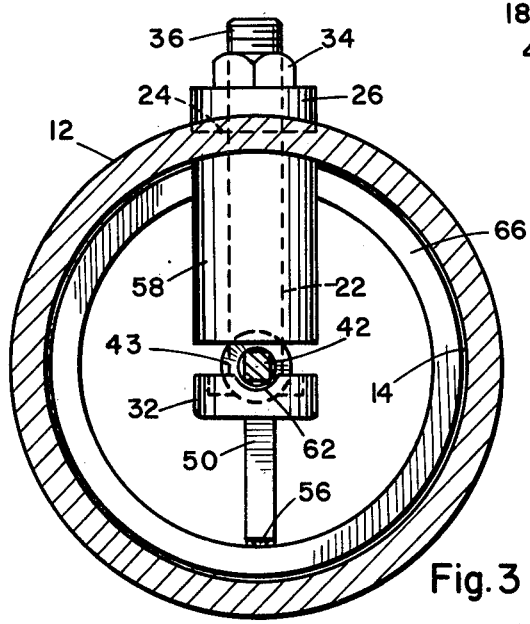
FIG. 3 is a sectional view taken on line 3—3 of FIG. 2.
Figure 4:
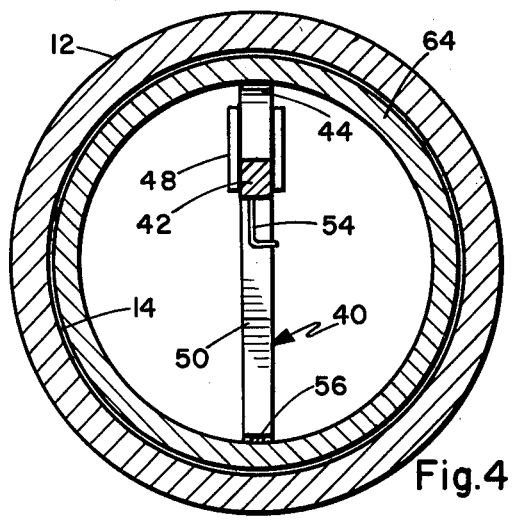
FIG. 4 is a sectional view taken on line 4—4 of FIG. 2.

FIGS. 2, 3, and 4 illustrates pipes 64 and 66 inserted into opposite ends of the connector. Bearing knob 44 is spaced from the inner wall of body 12 to allow each pipe to be inserted, the locking bar 50 being deflected inwardly by insertion of the pipe. Spring 54 biases the locking bar 50 outwardly so that the retaining spike 56 bears on the inner surface of the pipe. The length of locking bar 50 is such that, when diametrically extended, the outside distance between the spiked end and bearing knob 44 is greater than the internal diameter of the pipe. When the pipe is withdrawn slightly, the retaining spike 56 grips and penetrates the pipe, causing a diametrical jamming action between the spiked end of the locking bar 50 and bearing knob 44. The pipe is thus held securely against further axial movement outwardly, and any tension or internal pressure will increase the binding action. With some types of pipes it would be preferably to have the locking members completely within the connector, so that the connector body would reinforce the pipe under the jamming pressure. In inserting the pipes, the sleeve 58 acts as a stop to limit the insertion and provides indication that the pipe should be withdrawn to lock the connection. The O-rings 16 seal the external surfaces of the pipes to the connector. Other types of seals may be used, depending on the pressures to be contained.

To release the lock and dismantle the connection, nut 34 is loosened and backed off a few turns. This loosens the clamp on heads 43 and allows them to be pulled from the clamp bolt. The locking members are either removed in the pipes and extracted manually, or collapse in the connector when loosened. It is then a simple matter to re-insert the heads 43 into the clamp bolt channels and secure the assembly for subsequent use. It has been found that it is not necessary for the nut 34 to be excessively tight, since the pipe holding action is by the jamming of the locking members. The nut need only be finger tight, so no tools are required for disassembly. The conical heads 43 are securely held against axial movement but are not necessarily tightly locked by the clamping pressure. Each head 43 can thus rotate on its axis while frictionally held in the opposed channels 33 and 60, allowing the pipe to be rotated while clamped in place for ease of alignment where necessary.

The structure is illustrated in a double ended straight connector, but is adaptable to a single connection, such as an end cap or in a tank or storage vessel, or in an ell or tee connector. In the latter, three locking members could be secured by the same clamp bolt, or even four locking members for a cross connector.

The connector is particularly adaptable but not limited to irrigation systems, which often require rapid on-site assembly and subsequent removal and portability. Many other such uses will be apparent.

Having described my invention, I now claim:

1. A pipe connector, comprising:
    a substantially cylindrical body having an internal bore for receiving an end of a cylindrical pipe inserted therein;
    a locking member releasably secured in at least one end of said body;
    said locking member having a support bar with a radially outwardly projecting bearing knob spaced from said internal bore to engage the inner wall surface of a pipe inserted in the bore;
    a locking bar having one end pivotally attached to said support bar and extending substantially diametrically across said body, said locking bar being pivoted to swing axially inwardly into the body and being biased outwardly therefrom;
    the other end of said locking bar having retaining means for engaging the inner wall surface of a pipe inserted in said bore, at a position diametrically opposed to said bearing knob and said retaining means at its greatest diametrical extension, being spaced from said bearing knob at a distance greater than the internal diameter of the pipe, whereby a jamming action inside the pipe is provided between said retaining means and said bearing knob.

2. A pipe connector according to claim 1, wherein said retaining means is a spike projecting from said locking bar for penetrating the inner wall surface of the pipe.

3. A pipe connector according to claim 1, wherein said support bar has a stop portion limiting the outward pivotal motion of said locking bar.

4. A pipe connector according to claim 1, and including a clamp bolt extending substantially radially through said body and having a threaded outer end with a clamp nut thereon, said clamp bolt having an inner end with clamp means for securing the locking member.

5. A pipe connector according to claim 4, wherein said clamp means includes a sleeve on said clamp bolt inside said body, the inner end of said clamp bolt having an enlarged portion, said support bar being clamped between said enlarged end and said sleeve to hold said bearing knob in spaced relation to said internal bore.

6. A pipe connector according to claim 5, wherein said support bar has an inner end with an enlarged head thereon, said sleeve and the enlarged portion of said clamp bolt having opposed channels in which said head is retained.

7. A pipe connector according to claim 6, wherein said head is substantially conical, with the axis thereof coaxial with the axis of said body.

8. A pipe connector according to claim 7, wherein said enlarged portion has a notch through which the inner end of said support bar passes to hold the locking member in alignment in said body, the locking member being axially rotatable in the body about the axis of said conical head, while the conical head is frictionally held between said support bar and said enlarged portion of the clamp bolt.

9. A pipe connector according to claim 5, wherein said sleeve projects inside said body and provides a stop to limit insertion of pipes therein.

10. A pipe connector according to claim 5, and including sealing means on said clamp bolt between said nut and said body.

* * * * *